US008865350B2

(12) United States Patent
Yamada et al.

(10) Patent No.: US 8,865,350 B2
(45) Date of Patent: Oct. 21, 2014

(54) NONAQUEOUS ELECTROLYTE BATTERY (75) Inventors: Ichiro Yamada, Fukushima (JP);
Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 13/025,828

(22) Filed: Feb. 11, 2011

(65) Prior Publication Data

US 2011/0200885 A1 Aug. 18, 2011

(30) Foreign Application Priority Data

Feb. 18, 2010 (JP) ................................ P2010-033361

(51) Int. Cl.
| | |
|---|---|
| H01M 4/48 | (2010.01) |
| H01M 10/0565 | (2010.01) |
| H01M 4/583 | (2010.01) |
| H01M 2/14 | (2006.01) |
| H01M 10/052 | (2010.01) |
| H01M 4/02 | (2006.01) |
| H01M 10/0567 | (2010.01) |

(52) U.S. Cl.
CPC .......... *H01M 10/0565* (2013.01); *H01M 4/583* (2013.01); *H01M 2/14* (2013.01); *H01M 2300/0025* (2013.01); *H01M 2004/027* (2013.01); *H01M 10/052* (2013.01); *H01M 10/0567* (2013.01); *H01M 2004/021* (2013.01); *H01M 2300/0085* (2013.01); *Y02E 60/122* (2013.01)
USPC ........ 429/231.8; 429/323; 429/330; 429/332; 429/334; 429/341; 429/199; 429/200; 252/62.2

(58) Field of Classification Search
CPC ... H01M 4/583; H01M 2/14; H01M 10/0567; H01M 2004/027; H01M 2300/0025
USPC ......... 429/323, 330, 332, 334, 341, 199, 200, 429/231.8; 252/62.2
See application file for complete search history.

(56) References Cited

U.S. PATENT DOCUMENTS

| | | | |
|---|---|---|---|
| 2009/0191462 A1 | 7/2009 | Matsui et al. | |
| 2010/0062344 A1 | 3/2010 | Koh et al. | |

FOREIGN PATENT DOCUMENTS

| | | | |
|---|---|---|---|
| CN | 101481109 | | 7/2009 |
| CN | 101606266 | | 12/2009 |
| JP | 08-045545 | | 2/1996 |
| JP | 10-040955 | * | 2/1998 |
| JP | 10-189042 | | 7/1998 |
| JP | 2002-329528 | | 11/2002 |

OTHER PUBLICATIONS

The State Intellectual Property Office of the People's Republic of China, Notification of the First Office Action issued in connection with PRC Application No. 201110035869.6, dated Apr. 14, 2014. (20 pages).

* cited by examiner

*Primary Examiner* — Laura Weiner
(74) *Attorney, Agent, or Firm* — K&L Gates LLP (57) ABSTRACT

A nonaqueous electrolyte battery is provided and includes a positive electrode, a negative electrode having a negative electrode active material layer containing a negative electrode active material, a separator disposed between the positive electrode and the negative electrode, and a non-fluid electrolyte. The non-fluid electrolyte contains an electrolyte salt, a nonaqueous solvent, an orthoester compound represented by the following formula (1), and at least one member selected from the group consisting of cyclic carbonate compounds represented by the following formula (2) to (5). A volume viscosity of the negative electrode active material layer is 1.50 g/cc or more and not more than 1.75 g/cc, and a specific surface area of the negative electrode active material is 0.8 $m^2/g$ or more and not more than 4.0 $m^2/g$ (1)
$$R1-\underset{\underset{OR4}{|}}{\overset{\overset{OR2}{|}}{C}}-OR3$$

(2)
$$\begin{array}{c}R6\phantom{xx}R7\\R5-C-C-R8\\\phantom{xx}O\phantom{x}O\\\phantom{xxxx}C\\\phantom{xxxx}\|\\\phantom{xxxx}O\end{array}$$

(3)
$$\begin{array}{c}R9\phantom{xx}R10\\C=C\\O\phantom{x}O\\\phantom{xx}C\\\phantom{xx}\|\\\phantom{xx}O\end{array}$$

(4)
$$\begin{array}{c}R12\phantom{xx}R13\\R11-C-C-R14\\\phantom{xxx}O\phantom{x}O\\\phantom{xxxxx}C\\\phantom{xxxxx}\|\\\phantom{xxxxx}O\end{array}$$

(5)
$$\begin{array}{c}H\phantom{xxx}R15.\\H-C-C\\\phantom{xxx}O\phantom{x}O\\\phantom{xxxxx}C\\\phantom{xxxxx}\|\\\phantom{xxxxx}O\end{array}$$

6 Claims, 2 Drawing Sheets

NONAQUEOUS ELECTROLYTE BATTERY

CROSS REFERENCES TO RELATED APPLICATIONS

The present application claims priority to Japanese Patent Application JP 2010-033361 filed on Feb. 18, 2010, the entire contents of which is hereby incorporated by reference.

BACKGROUND

The present disclosure relates to a nonaqueous electrolyte and to a nonaqueous electrolyte battery. In more detail, the present disclosure relates to a nonaqueous electrolyte containing a nonaqueous solvent and an electrolyte salt and to a nonaqueous electrolyte secondary battery using the same.

In recent years, portable electronic appliances such as a camera-integrated VTR (video tape recorder), a mobile phone and a laptop personal computer have widely spread, and it is strongly demanded to realize downsizing, weight reduction and long life thereof. Following this, the development of batteries as a power source, in particular, secondary batteries which are lightweight and from which a high energy density is obtainable is advanced.

Above all, lithium ion secondary batteries utilizing intercalation and deintercalation of lithium (Li) for a charge/discharge reaction are largely expected because a high energy density is obtainable as compared with lead batteries and nickel-cadmium batteries. Such a lithium ion secondary battery is provided with an electrolyte together with a positive electrode and a negative electrode, and the development is extensively advanced for the purpose of enhancing various performances of nonaqueous electrolyte secondary batteries.

In particular, laminated batteries using an aluminum laminated film for a package member have a large energy density because of their light weight. However, in the laminated batteries, in the case of using an electrolyte composed of a fluid electrolyte such as existing electrolytic solutions, a problem such as liquid leakage following deformation of the package member to be caused due to expansion of the battery is easily generated. For that reason, as a method for solving this problem, batteries using a non-fluid electrolyte such as solid electrolytes and gel electrolytes are watched. The batteries using a non-fluid electrolyte have such advantages that they are low in a concern of liquid leakage, so that the safety is enhanced; and that a lightweight and thin material such as an aluminum laminated film can be used for the package member.

Meanwhile, following a more increase of the energy density of nonaqueous electrolyte secondary batteries, in order to increase the charge/discharge characteristics of the battery, it is necessary to make a delivery speed of ions between a positive electrode and a negative electrode fast as far as possible. For achieving this, it is necessary to make it easy to cause the mass transfer by diffusion by increasing an ion conductivity of the electrolyte or decreasing a viscosity of the electrolyte. However, in secondary batteries using a non-fluid electrolyte, such characteristics are of a problem. That is, in electrolytic solutions which are a existing fluid electrolyte, the transfer of ions in the liquid is easy, whereas in non-fluid electrolytes, the ion conductivity of the electrolyte is reduced because of its viscosity. In order to improve these performances, Patent Documents 1 to 3 (JP-A-08-045545, JP-A-2002-329528 and JP-A-10-189042) propose techniques for stabilizing the electrode surface by forming a coating film which is called an SEI (solid electrolyte interface) coating on the electrode at the time of charge/discharge at the beginning of use of the battery.

By such an additive-containing electrolyte constitution, an improvement in the battery characteristics is found. However, as to the foregoing problem of the electrolyte, in the case where it is contrived to realize a higher capacity in the future, a much more enhancement is demanded. In particular, this phenomenon becomes conspicuous in the use over a long period of time. As a result, not only deterioration of the storage characteristic and rate characteristic is caused due to a lowering of the ion conductivity, but in the case of using a shape-changeable package member such as an aluminum laminated film, deformation of the battery such as an increase of the battery thickness becomes problematic.

In the electrolytic solutions containing an unsaturated group-containing cyclic compound such as vinylene carbonate (VC), as proposed by the foregoing patent documents, by covering the surface of a negative electrode with a coating film, side reactions caused on the surface of the negative electrode, such as decomposition of a solvent, can be suppressed. For that reason, a lowering of the initial capacity and the like are improved. For such a reason, in particular, vinylene carbonate (VC) is widely used as an additive of the electrolytic solution.

SUMMARY

However, since the coating film formed by decomposition of vinylene carbonate (VC) is low in durability, there was involved such a drawback that it is decomposed during the long-term use of the battery or under a high temperature environment, resulting in deterioration of the battery characteristics. Conversely, even when a certain amount or more amount of vinylene carbonate is added in the electrolytic solution, the formed coating film component merely increases, and an increase of the initial resistance occurs, so that the battery characteristics cannot be improved.

Such a problem becomes more conspicuous with an increase of a reaction area of the negative electrode. In the case where the negative electrode is made to have a high density for the purpose of allowing the battery to have a higher capacity, in view of necessity for ensuring a reaction interface between the negative electrode and the electrolytic solution, a material having a larger specific surface area is used. Therefore, it is more important to suppress a side reaction of the electrolytic solution on the negative electrode surface.

In consequence, it is desirable to provide a secondary battery using a non-fluid electrolyte, in which an increase of the resistance is suppressed even after long-term cycles, and the battery characteristics are kept.

According to an embodiment, there is provided a nonaqueous electrolyte battery including a positive electrode; a negative electrode having a negative electrode active material layer containing a negative electrode active material; a separator disposed between the positive electrode and the negative electrode; and a non-fluid electrolyte, wherein the non-fluid electrolyte contains an electrolyte salt, a nonaqueous solvent, an orthoester compound represented by the following formula (1) and at least one member selected from the group consisting of cyclic carbonate compounds represented by the following formula (2) to (5);

a volume density of the negative electrode active material layer is 1.50 g/cc or more and not more than 1.75 g/cc; and a specific surface area of the negative electrode active material is 0.8 $m^2/g$ or more and not more than 4.0 $m^2/g$.

According to another embodiment, there is provided a nonaqueous electrolyte composition containing an electrolyte salt, a nonaqueous solvent, an orthoester compound rep- resented by the following formula (1) and at least one member selected from the group consisting of cyclic carbonate compounds represented by the following formula (2) to (5).

(1)

In the formula (1), R1 represents a hydrogen atom, an alkyl group or an aryl group, and preferably a hydrogen atom or an aryl group. Each of R2 to R4 independently represents an alkyl group, a halogenated alkyl group or an aryl group, and preferably an alkyl group having from 1 to 10 carbon atoms or an aryl group, and especially preferably a methyl group, an ethyl group or a propyl group.

(2)

In the formula (2), each of R5 to R8 represents a hydrogen atom, a halogen group, an alkyl group or a halogenated alkyl group, provided that at least one of R5 to R8 represents a halogen group or a halogenated alkyl group, and R5 to R8 may be the same as or different from each other. Though the kind of the halogen is not particularly limited, for example, at least one member selected from the group consisting of fluorine, chlorine and bromine is exemplified, and above all, fluorine is preferable. This is because high effects are obtainable. As a matter of course, the halogen may be other halogen.

(3)

In the formula (3), each of R9 and R10 represents a hydrogen atom or an alkyl group.

(4)

In the formula (4), each of R11 to R14 represents a hydrogen atom, an alkyl group, a vinyl group or an allyl group, provided that at least one of R11 to R14 represents a vinyl group or an allyl group.

(5)

In the formula (5), R15 represents an alkylene group.

In the foregoing embodiments, it is preferable that the orthoester compound is an orthoformate; the cyclic carbonate compound represented by the formula (2) is 4-fluoro-1,3-dioxolan-2-one or 4,5-difluoro-1,3-dioxolan-2-one; the cyclic carbonate compound represented by the formula (3) is vinylene carbonate; the cyclic carbonate compound represented by the formula (4) is vinyl ethylene carbonate; and the cyclic carbonate compound represented by the formula (5) is methylene ethylene carbonate.

Also, it is preferable that a content of the orthoester compound in the non-fluid electrolyte is 0.01% by weight or more and not more than 1% by weight; and a content of the cyclic carbonate compound in the non-fluid electrolyte is 0.5% by weight or more and not more than 40% by weight.

In the foregoing embodiments, since the electrolyte layer contains the orthoester compound represented by the formula (1) and the cyclic carbonate compound represented by any of the formulae (2) to (5), in the nonaqueous electrolyte battery, a stable coating film is formed on the surface of the active material, and a decomposition reaction of the electrolytic solution is suppressed.

According to the foregoing embodiments, in a battery using a non-fluid electrolyte, it is possible to provide high capacity retention rate and load characteristic and to realize low battery resistance.

Additional features and advantages are described herein, and will be apparent from the following Detailed Description and the figures.

DETAILED DESCRIPTION

Embodiments are hereunder described in the following order.

1. First embodiment (an example of nonaqueous electrolyte)
2. Second embodiment (an example of nonaqueous electrolyte battery)

1. First Embodiment (1-1) Constitution of Nonaqueous Electrolyte:

In a first embodiment, a nonaqueous electrolyte is described in detail.

[Constitution of Nonaqueous Electrolyte]

In the nonaqueous electrolyte according to the first embodiment, a non-fluid electrolyte containing a nonaqueous solvent and an electrolyte salt and having ion conductivity (the non-fluid electrolyte will be hereinafter properly referred to as "nonaqueous electrolyte") further contains an orthoester compound and a cyclic carbonate compound. The non-fluid electrolyte according to the first embodiment is hereunder described in detail. First of all, the orthoester compound and the cyclic carbonate compound are specifically described.

[Orthoester Compound]

The orthoester compound has an effect for lowering the resistance of a coating film to be formed on the surface of a negative electrode active material. That is, a coating film on the surface of a negative electrode active material, which is formed by adding the cyclic carbonate according to the first embodiment to the non-fluid electrolyte for the purpose of making the negative electrode surface stable, can be converted into a more suitable coating film with low resistance by the orthoester compound.

An electrolyte layer according to the first embodiment contains an orthoester compound represented by the following formula (1).

(1)

In the formula (1), $R1$ represents a hydrogen atom, an alkyl group or an aryl group, and preferably a hydrogen atom or an aryl group. Each of $R2$ to $R4$ independently represents an alkyl group, a halogenated alkyl group or an aryl group, and preferably an alkyl group having from 1 to 10 carbon atoms or an aryl group, and especially preferably a methyl group, an ethyl group or a propyl group.

Specific examples of the orthoester compound are given below, but it should not be construed that the orthoester compound is limited thereto.

Examples of the orthoester compound represented by the formula (1) include orthoester compounds such as orthoformates, orthoacetates, orthopropionates, orthobutyrates, orthovalerates and orthobenzoates. Above all, trimethyl orthoformate, triethyl orthoformate, tripropyl orthoformate, trimethyl orthovalerate and triethyl orthobenzoate are preferable. This is because not only these materials are easily available, but high effects are obtainable. These orthoester compounds may be used in admixture of two or more kinds thereof.

It is preferable that the orthoester compound represented by the formula (1) is contained in an amount of 0.01% by weight or more and not more than 1% by weight in the non-fluid electrolyte. In the case where the addition amount of the orthoester compound falls within the foregoing range, in a battery using this non-fluid electrolyte, it is possible to enhance the discharge capacity retention rate and load characteristic. Also, blister of the battery to be caused due to the gas generation or the like in the inside of the battery is suppressed, and even after the storage at high temperatures, an increase of resistance of the battery is suppressed.

[Cyclic Carbonate Compound]

When the cyclic carbonate compound is contained in the non-fluid electrolyte, a coating film is formed on the surface of a negative electrode within a battery system, thereby stabilizing the surface of the negative electrode.

The electrolyte layer according to the first embodiment contains at least one member selected from the group consisting of cyclic carbonate compounds represented by the following formula (2) to (5). The cyclic carbonate compound represented by the formula (2) is a cyclic carbonate compound having a halogen as a constituent element; and each of the cyclic carbonate compounds represented by the formulae (3) to (5) is a cyclic carbonate compound having an unsaturated bond.

(2)

In the formula (2), each of $R5$ to $R8$ represents a hydrogen atom, a halogen group, an alkyl group or a halogenated alkyl group, provided that at least one of $R5$ to $R8$ represents a halogen group or a halogenated alkyl group, and $R5$ to $R8$ may be the same as or different from each other. Though the kind of the halogen is not particularly limited, for example, at least one member selected from the group consisting of fluorine, chlorine and bromine is exemplified, and above all, fluorine is preferable. This is because high effects are obtainable. As a matter of course, the halogen may be other halogen.

(3)

In the formula (3), each of $R9$ and $R10$ represents a hydrogen atom or an alkyl group.

(4)

In the formula (4), each of $R11$ to $R14$ represents a hydrogen atom, an alkyl group, a vinyl group or an allyl group, provided that at least one of $R11$ to $R14$ represents a vinyl group or an allyl group.

(5)

In the formula (5), $R15$ represents an alkylene group.

Examples of the cyclic carbonate compound having a halogen represented by the formula (2) include 4-fluoro-1,3-dioxolan-2-one, 4-chloro-1,3-dioxolan-2-one, 4,5-difluoro-1, 3-dioxolan-2-one, tetrafluoro-1,3-dioxolan-2-one, 4-chloro-5-fluoro-1,3-dioxolan-2-one, 4,5-dichloro-1,3-dioxolan-2-one, tetrachloro-1,3-dioxolan-2-one, 4,5-bistrifluoromethyl-1,3-dioxolan-2-one, 4-trifluoromethyl-1,3-dioxolan-2-one, 4,5-difluoro-4,5-dimethyl-1,3-dioxolan-2-one, 4,4-difluoro-5-methyl-1,3-dioxolan-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-(1,1-difluoroethyl)-4,4-difluoro-1,3-dioxolan-2-one, 4,5-dichloro-4,5-dimethyl-1,3-dioxolan-2-one, 4-ethyl-5-fluoro-1,3-dioxolan-2-one, 4-ethyl-4,5-difluoro-1,3-dioxolan-2-one, 4-ethyl-4,5,5-trifluoro-1,3-dioxolan-2-one and 4-fluoro-4-methyl-1,3-dioxolan-2-one. These materials may be used singly or in admixture of plural kinds thereof. Of these, 4-fluoro-1,3-dioxolan-2-one and 4,5-difluoro-1,3-dioxolan-2-one are preferable. This is because not only these materials are easily available, but high effects are obtainable.

The cyclic carbonate compound having an unsaturated bond represented by the formula (3) is a vinylene carbonate based compound. Examples of this vinylene carbonate based compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one and 4-trifluoromethyl-1,3-dioxol-2-one. These materials may be used singly or in admixture of plural kinds thereof. Of these, vinylene carbonate is preferable. This is because not only this material is easily available, but high effects are obtainable.

The cyclic carbonate compound having an unsaturated bond represented by the formula (4) is a vinyl ethylene carbonate based compound. Examples of the vinyl ethylene carbonate based compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one and 4,5-divinyl-1,3-dioxolan-2-one. These materials may be used singly or in admixture of plural kinds thereof. Of these, vinyl ethylene carbonate is preferable. This is because not only this material is easily available, but high effects are obtainable. As a matter of course, as to R11 to R14, all of them may be a vinyl group or an allyl group, or a vinyl group and an allyl group may be coexistent with each other.

The cyclic carbonate compound having an unsaturated bond represented by the formula (5) is a methylene ethylene carbonate based compound. Examples of the methylene ethylene carbonate based compound include 4-methylene-1,3-dioxolan-2-one, 4,4-dimethyl-5-methylene-1,3-dioxolan-2-one and 4,4-diethyl-5-methylene-1,3-dioxolan-2-one. These materials may be used singly or in admixture of plural kinds thereof. This methylene ethylene carbonate based compound may also be a compound having two methylene groups in addition to a compound having one methylene group (compound represented by the formula (5)).

The cyclic carbonate compound having an unsaturated bond may be a catechol carbonate having a benzene ring, or the like in addition to the compounds represented by the formulae (3) to (5).

It is preferable that the cyclic carbonate compound represented by any of the formulae (2) to (5) is contained in an amount of 0.5% by weight or more and not more than 40% by weight in the non-fluid electrolyte. This is because in the case where the addition amount of the cyclic carbonate compound falls within the foregoing range, a coating film on the surface of an active material is favorably formed. Then, in the battery using this non-fluid electrolyte, the discharge capacity retention rate and load characteristic can be enhanced by the orthoester compound. Also, blister of the battery to be caused due to the gas generation or the like in the inside of the battery is suppressed, and even after the storage at high temperatures, an increase of resistance of the battery is suppressed.

[Nonaqueous Solvent]

Next, the nonaqueous solvent contained in the non-fluid electrolyte layer is described. Examples of the nonaqueous solvent which can be used include ethylene carbonate (EC), propylene carbonate (PC), butylene carbonate (BC), dimethyl carbonate (DMC), diethyl carbonate (DEC), ethyl methyl carbonate (EMC), methyl propyl carbonate (MPC), γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethyl sulfoxide. This is because excellent capacity, cycle characteristics and storage characteristics are obtainable in electrochemical devices such as batteries provided with a non-fluid electrolyte. These materials may be used singly or in admixture of plural kinds thereof.

Above all, it is preferable to use one containing, as the nonaqueous solvent, at least one member selected from the group consisting of ethylene carbonate, propylene carbonate, dimethyl carbonate, diethyl carbonate and ethyl methyl carbonate. This is because sufficient effects are obtainable. In that case, in particular, it is preferable to use one containing a mixture of ethylene carbonate or propylene carbonate, each of which is a high viscosity (high dielectric constant) solvent (for example, specific dielectric constants $\in \geq 30$), and dimethyl carbonate, diethyl carbonate or ethyl methyl carbonate, each of which is a low viscosity solvent (for example, viscosity $\leq 1$ mPa·s). This is because dissociation properties of the electrolyte salt and mobility of ions are enhanced, so that higher effects are obtainable.

[Electrolyte Salt]

The electrolyte salt contains, for example, one or two or more kinds of light metal salts such as lithium salts. Examples of such a lithium salt include hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr). Above all, at least one member selected from the group consisting of lithium hexafluorophosphate, lithium tetrafluoroborate, lithium perchlorate and lithium hexafluoroarsenate is preferable, and lithium hexafluorophosphate is more preferable. This is because the resistance of the electrolyte layer is lowered.

Though the non-fluid electrolyte layer according to the first embodiment may be a complete solid type electrolyte composed of a solid, in view of ensuring high ion conductivity, it is preferable to hold an electrolytic solution having an electrolyte salt and a nonaqueous solvent on a polymer, thereby forming a non-fluidized electrolyte layer in a semi-solid state.

In the non-fluid electrolyte in a semi-solid state, as the polymer for holding the electrolytic solution thereon, there can be exemplified polymers having the foregoing functions, such as alkylene oxide based polymers having an alkylene oxide unit; and fluorocarbon based polymers, for example, polyvinylidene fluoride (PVdF) and a vinylidene fluoride (VdF)-hexafluoropropylene (HFP) copolymer.

Though a concentration of such a polymer relative to the electrolytic solution varies depending upon a molecular weight of the polymer to be used and the like, it is in general 0.1% by weight or more and not more than 30% by weight. When the concentration of the polymer is too low, there may be the case where the electrolytic solution holding properties are lowered, so that problems of flowing and liquid leakage are caused. Also, when the concentration of the polymer is too high, not only the viscosity becomes excessively high, so that difficulty on the step is encountered; but a proportion of the electrolytic solution is lowered, and the ion conductivity is lowered, so that battery characteristics such as rate characteristic tend to be lowered.

A use amount of the electrolytic solution in the non-fluid electrolyte in a semi-solid state is preferably 50% by weight or more and not more than 99% by weight relative to a total amount of the non-fluid electrolyte. When the use amount of the electrolytic solution is too large, holding of the electrolytic solution becomes difficult, so that liquid leakage is easily generated. Conversely, when the use amount of the electrolytic solution is too small, there may be the case where the charge/discharge efficiency and capacity become insufficient.

The non-fluid electrolyte in a semi-solid state can be obtained by holding the foregoing electrolytic solution composed of a mixture of the nonaqueous solvent and the electrolyte salt on the polymer. Also, besides, constitutions such as (1) a non-fluid electrolyte formed by subjecting an electrolytic solution containing a polymerizable gelling agent to a polymerization treatment such as ultraviolet curing and heat curing; and (2) a non-fluid electrolyte formed by cooling a polymer having been dissolved in an electrolytic solution at high temperatures to ordinary temperature can be used.

In the case of the method (1) using an electrolytic solution containing a polymerizable gelling agent, examples of the polymerizable gelling agent which can be used include materials having an unsaturated double bond such as an acryloyl group, a methacryloyl group, a vinyl group and an allyl group. Specifically, acrylic acid, methyl acrylate, ethyl acrylate, ethoxyethyl acrylate, methoxyethyl acrylate, ethoxyethoxyethyl acrylate, polyethylene glycol monoacrylate, ethoxyethyl methacrylate, methoxyethyl methacrylate, ethoxyethoxyethyl methacrylate, polyethylene glycol monomethacrylate, N,N-diethylaminoethyl acrylate, N,N-dimethylaminoethyl acrylate, glycidyl acrylate, allyl acrylate, acrylonitrile, N-vinylpyrrolidone, diethylene glycol diacrylate, triethylene glycol diacrylate, tetraethylene glycol diacrylate, polyethylene glycol diacrylate, diethylene glycol dimethacrylate, triethylene glycol dimethacrylate, tetraethylene glycol dimethacrylate, polyethylene glycol dimethacrylate, polyalkylene glycol diacrylates and polyalkylene glycol dimethacrylates. Furthermore, trifunctional monomers such as trimethylolpropane alkoxylate triacrylates and pentaerythritol alkoxylate triacrylates; tetrafunctional or polyfunctional monomers such as pentaerythritol alkoxylate tetraacrylates and ditrimethylolpropane alkoxylate tetraacrylates; and so on can be used. Above all, oxyalkylene glycol based compounds having an acryloyl group or a methacryloyl group are preferable.

Meanwhile, in the case of the method (2) of forming an electrolyte in a semi-solid state by cooling a polymer having been dissolved in an electrolytic solution at high temperatures to ordinary temperature, any material which is able to form a gel relative to the electrolytic solution and which is stable as a battery material can be used as such a polymer. Examples thereof include polymers having a ring, such as polyvinylpyridine and poly-N-vinylpyrrolidone; acrylic derivative based polymers such as polymethyl methacrylate, polyethyl methacrylate, polybutyl methacrylate, polymethyl acrylate, polyethyl acrylate, polyacrylic acid and polymethacrylic acid polyacrylamide; fluorocarbon based resins such as polyvinyl fluoride and polyvinylidene fluoride; CN group-containing polymers such as polyacrylonitrile and polyvinylidene cyanide; polyvinyl alcohol based polymers such as polyvinyl acetate and polyvinyl alcohol; and halogen-containing polymers such as polyvinyl chloride and polyvinylidene chloride. Also, the polymer can be used even when it is a mixture, a modification, a derivative, a random copolymer, an alternating copolymer, a graft copolymer, a block copolymer or the like of the foregoing polymers or the like. A weight average molecular weight of such a polymer is preferably in the range of 10,000 or more and not more than 5,000,000. This is because when the molecular weight of the polymer is too low, a gel is hardly formed, whereas when it is too high, the viscosity becomes excessively high, so that handling becomes difficult. As the non-fluid electrolyte, it is possible to use the foregoing complete solid type electrolyte formed of a polymer and an electrolyte salt.

According to this non-fluid electrolyte, when it contains the orthoester compound represented by the formula (1) and at least one member selected from the group consisting of the cyclic carbonate compounds represented by the formulae (2) to (5), a stable coating film can be formed. For that reason, it is possible to obtain a battery in which a decomposition reaction of the electrolytic solution is suppressed, high capacity retention rate and load characteristic are provided, and resistance of the battery is low.

2. Second Embodiment

In a second embodiment according to the present invention, a nonaqueous electrolyte battery packaged by a laminated film is described.

(2-1) Configuration of Nonaqueous Electrolyte Battery

Figure 1:
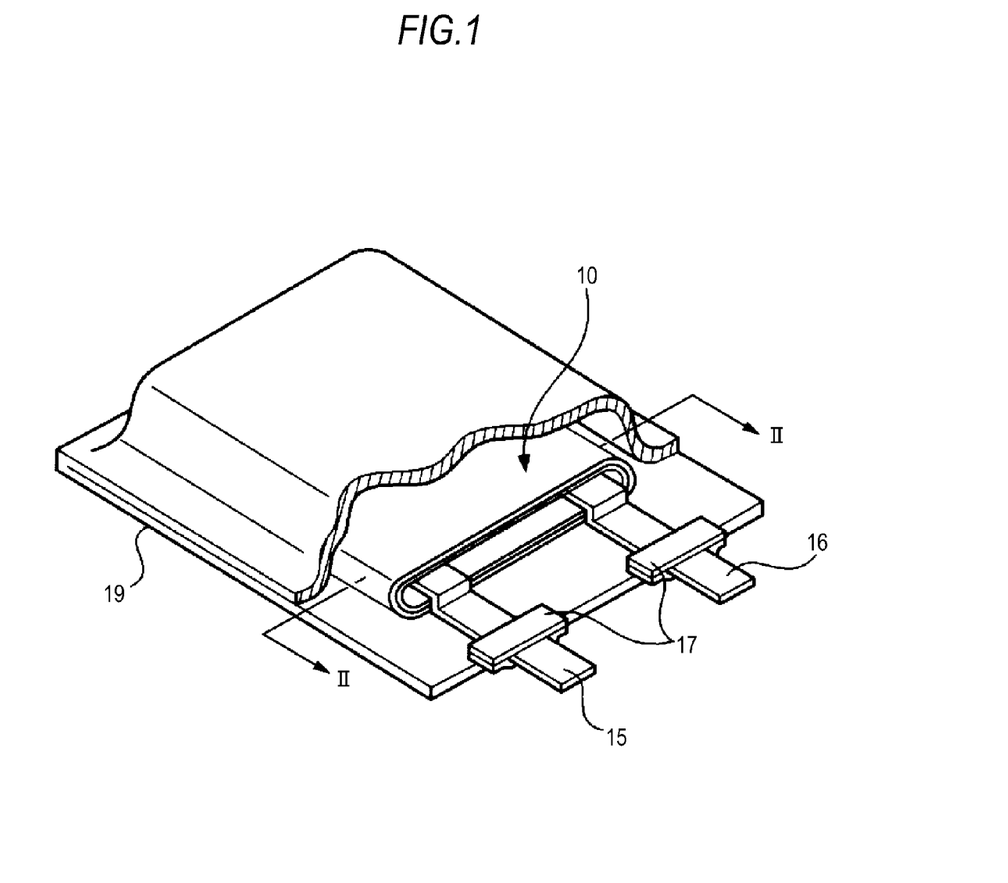
FIG. 1 is an exploded perspective view showing an example of a laminate type secondary battery which is a nonaqueous electrolyte battery according to an embodiment.
Figure 2:
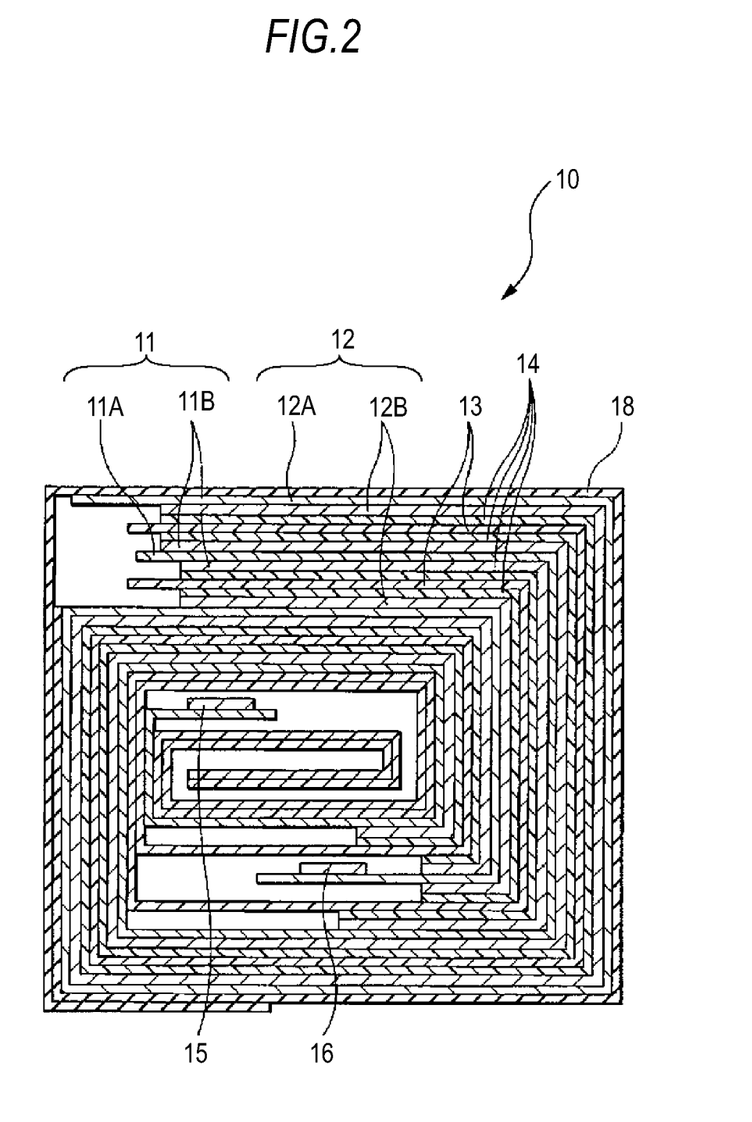
FIG. 2 is a sectional view along an II-II line of a battery device shown in FIG. 1.

FIG. 1 is a sectional view showing a configuration example of a nonaqueous electrolyte battery according to the second embodiment. Also, FIG. 2 shows an electrode laminated structure of a nonaqueous electrolyte battery according to the second embodiment.

This nonaqueous electrolyte battery has a configuration in which a wound electrode body 10 having a positive electrode lead 15 and a negative electrode lead 16 installed therein is housed in the inside of a film-shaped package member 19 and has a flat shape. Each of the positive electrode lead 15 and the negative electrode lead 16 is, for example, formed in a strip shape and led out from the inside of the package member 19 toward the outside in, for example, the same direction. The positive electrode lead 15 is, for example, constituted of a metal material such as aluminum (Al), and the negative electrode lead 16 is, for example, constituted of a metal material such as nickel (Ni).

[Package Member]

The package member 19 is a laminated film having a structure in which, for example, a heat-fusible layer, a metal layer and a package resin layer are laminated in this order and stuck by means of lamination processing or the like. In the package member 19, for example, the respective outer edges are allowed to closely adhere to each other by means of fusion or with an adhesive such that the side of the heat-fusible layer is faced inward.

The heat-fusible layer is, for example, constituted of a polyolefin resin such as polyethylene, polypropylene, modified polyethylene, modified polypropylene and a copolymer thereof. This is because the moisture permeability can be made low, and the air tightness is excellent. The metal layer is constituted of aluminum, stainless steel, nickel, iron or the like in a foil form or a plate form. The package resin layer may be, for example, constituted of the same resin as that in the heat-fusible layer, or may be constituted of nylon or the like. This is because the strength against breakage, piercing or the like can be enhanced. The package member 19 may be provided with other layer than the heat-fusible layer, the metal layer and the package resin layer.

A contact film 17 is inserted between the package member 19 and each of the positive electrode lead 15 and the negative electrode lead 16 for the purposes of enhancing adhesion between each of the positive electrode lead 15 and the negative electrode lead 16 and the inside of the package member 19 and preventing invasion of the outside air. The contact film 17 is constituted of a material having adhesion to each of the positive electrode lead 15 and the negative electrode lead 16. In the case where each of the positive electrode lead 15 and the negative electrode lead 16 is constituted of the foregoing metal material, it is preferable that the contact film 17 is constituted of a polyolefin resin such as polyethylene, polypropylene, modified polyethylene and modified polypropylene.

FIG. 2 is a sectional view along an II-II line of the wound electrode body 10 shown in FIG. 1. The wound electrode body 10 is one prepared by laminating a positive electrode 11 and a negative electrode 12 via a separator 13 and a nonaqueous electrolyte layer 14 which is a non-fluid electrolyte and winding the laminate, and an outermost peripheral part thereof is protected by a protective tape 18.

[Positive Electrode]

The positive electrode 11 is one in which a positive electrode active material layer 11B containing a positive electrode active material is formed on the both surfaces of a positive electrode collector 11A. For the positive electrode collector 11A, for example, a metal foil such as an aluminum (Al) foil, a nickel (Ni) foil and a stainless steel (SUS) foil can be used.

The positive electrode active material layer 11B is, for example, constituted so as to contain a positive electrode active material, a conductive agent and a binder. As the positive electrode active material, a metal oxide, a metal sulfide or a specified polymer can be used depending upon the desired type of battery. For example, when a lithium ion battery is constituted, a complex oxide of lithium and a transition metal, which is composed mainly of $Li_xMO_2$ (in the formula, M represents at least one transition metal; and x varies depending upon the charge/discharge state and is in general 0.05 or more and not more than 1.10), is used. As the transition metal constituting the lithium complex oxide, cobalt (Co), nickel (Ni), manganese (Mn) and so on are useful.

Specific examples of such a lithium complex oxide include $LiCoO_2$, $LiNiO_2$, $LiMn_2O_4$ and $LiNi_yCo_{1-y}O_2$ (0<y<1). Also, a solid solution obtained by substituting a part of the transition metal elements with other element can be used. Examples thereof include $LiNi_{0.5}Co_{0.5}O_2$ and $LiNi_{0.8}Co_{0.2}O_2$. Such a lithium complex oxide is able to produce a high voltage and is excellent in the energy density.

Also, as the positive electrode active material, metal sulfides or oxides not containing lithium, such as $TiS_2$, $MoS_2$, $NbSe_2$ and $V_2O_5$, may be used. These positive electrode active materials may be used singly or in admixture of plural kinds thereof.

Examples of the conductive agent include carbon materials such as graphite, carbon black, acetylene black and ketjen black. These materials may be used singly or in admixture of plural kinds thereof. The conductive agent may be a metal material, a conductive polymer or the like so far as it is a material having conductivity.

Examples of the binder include synthetic rubbers such as a styrene butadiene based rubber, a fluorocarbon based rubber and ethylene propylene diene; and polymer materials such as polyvinylidene fluoride. These materials may be used singly or in admixture of plural kinds thereof.

The positive electrode 11 has the positive electrode lead 15 connected by spot welding or ultrasonic welding to one end portion of the positive electrode collector 11A. As the positive electrode lead 15, a metal foil or a network material is desirable. However, other material than a metal is also useful so far as it is stable electrochemically and chemically and has conductivity. Examples of a material of the positive electrode lead 15 include aluminum (Al) and nickel (Ni).

[Negative Electrode]

The negative electrode 12 is one in which a negative electrode active material layer 12B containing a negative electrode active material is formed on the both surfaces of a negative electrode collector 12A. For the negative electrode collector 12A, for example, a metal foil such as a copper (Cu) foil, a nickel foil and a stainless steel foil, can be used.

The negative electrode active material layer 12B is, for example, constituted so as to contain a negative electrode active material and optionally, a conductive agent and a binder. As the negative electrode active material, a lithium metal, a lithium alloy, or a carbon material capable of doping and dedoping lithium or a complex material of a metallic material and a carbon based material is useful. Specific examples of the carbon material capable of doping and dedoping lithium include easily graphitized carbon, hardly graphitized carbon with a (002) plane interval of 0.37 nm or more and graphite with a (002) plane interval of not more than 0.34 nm. More specifically, there are exemplified pyrolytic carbons, cokes, vitreous carbon fibers, organic polymer compound baked materials, active carbon and carbon blacks. Of these, examples of the cokes include pitch coke, needle coke and petroleum coke. The organic polymer compound baked material as referred to herein is a material obtained through carbonization by baking a phenol resin, a furan resin or the like at an appropriate temperature. The carbon material is preferable because a change in a crystal structure following the intercalation and deintercalation of lithium is very small, and therefore, a high energy density is obtainable, excellent cycle characteristics are obtainable, and furthermore, the carbon material also functions as a conductive agent. The shape of the carbon material may be any of a fibrous shape, a spherical shape, a granular shape or a flaky shape.

Furthermore, as the material capable of doping and dedoping lithium, polymers such as polyacetylene and polypyrrole and oxides such as $SnO_2$ can be used.

In addition to the foregoing carbon materials, examples of the negative electrode material capable of intercalating and deintercalating lithium include a material capable of intercalating and deintercalating lithium and having, as a constituent element, at least one member selected from the group consisting of metal elements and semi-metal elements. This is because a high energy density is obtainable. Such a negative electrode material may be a simple substance, alloy or compound of a metal element or a semi-metal element. Also, a material having one or two or more kinds of a phase in at least a part thereof may be used.

The "alloy" as referred to herein includes, in addition to those composed of two or more kinds of a metal element, those containing one or more kinds of a metal element and one or more kinds of a semi-metal element. Also, the "alloy" may contain a non-metal element. Examples of its texture include a solid solution, a eutectic (eutectic mixture), an intermetallic compound and one in which two or more kinds thereof are coexistent.

Examples of the metal element or semi-metal element include a lithium metal. Also, examples of a metal element or a semi-metal element capable of forming an alloy together with lithium include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt).

As the negative electrode material constituted of a metal element or a semi-metal element capable of forming an alloy together with lithium, materials having, as a constituent element, at least one member selected from the group consisting of group 14 metal elements and semi-metal elements in the long form of the periodic table are preferable, and materials having, as a constituent element, at least one member selected from the group consisting of silicon (Si) and tin (Sn) are especially preferable. This is because such a material has large capability of intercalating and deintercalating lithium, so that a high energy density is obtainable.

Examples of the negative electrode material having at least one member selected from the group consisting of silicon and tin include a simple substance, alloy or compound of silicon; a simple substance, alloy or compound of tin; and a material having one or two or more kinds of a phase in at least a part thereof.

Examples of alloys of silicon include alloys having, as a second constituent element other than silicon, at least one member selected from the group consisting of tin, nickel, copper, iron, cobalt, manganese, zinc, indium, silver, titanium, germanium, bismuth, antimony (Sb) and chromium. Examples of compounds of silicon include compounds having oxygen or carbon (C), and these compounds may have the foregoing second constituent element in addition to silicon.

Examples of alloys or compounds of silicon include $SiB_2$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\le2$) and $LiSiO$.

Examples of alloys of tin include alloys having, as a second constituent element other than tin, at least one member selected from the group consisting of silicon, nickel, copper, iron, cobalt, manganese, zinc, indium, silver, titanium, germanium, bismuth, antimony and chromium. Examples of compounds of tin include compounds having oxygen or carbon, and these compounds may have the foregoing second constituent element in addition to tin. Examples of alloys or compounds of tin include $SnO_w$ ($0<w\le2$), $SnSiO_3$, $LiSnO$ and $Mg_2Sn$.

As the negative electrode active material, a carbon material having a BET specific surface area of 0.8 $m^2/g$ or more and not more than 4.0 $m^2/g$ is used. Such a carbon material is excellent in the electrolyte holding properties and easy for intercalation and deintercalation of a lithium ion on the electrode surface, so that high characteristics are obtainable.

In the case where the specific surface area of the carbon material is smaller than the foregoing range, when the negative electrode active material layer 12B is made to have a high density, not only the electrolyte holding properties are decreased, but a reaction area with the electrolyte is reduced, so that the load characteristic is lowered. Conversely, in the case where the specific surface area exceeds the foregoing range, the decomposition reaction of the electrolyte is accelerated, so that the gas generation tends to increase.

As such a carbon material, for example, a mixed material of artificial graphite having a relatively low specific surface area and natural graphite having a high specific surface area, or a carbon material whose specific surface area has been reduced by modifying the surface of natural graphite can be used. Examples of a method for achieving the surface modification include a method of heat treating a carbon material, a method of applying mechanical energy and a method of covering the surface of a carbon material with lowly crystalline carbon.

Also, a volume density of the negative electrode active material layer 12B is preferably 1.50 g/cc or more and not more than 1.80 g/cc, and more preferably 1.55 g/cc or more and not more than 1.75 g/cc. In the case where the volume density of the negative electrode active material layer 12B is too low, the mass of the active material per volume is small, and the conductivity is also lowered by voids in the negative electrode, so that the capacity is lowered. Also, in the case where the volume density of the negative electrode active material layer 12B is too high, the electrolytic solution holding properties in the electrode are lowered, and the transfer of a lithium ion on the electrode interface is disturbed. Thus, such is not preferable.

[Nonaqueous Electrolyte]

As the nonaqueous electrolyte, the nonaqueous electrolyte described in the first embodiment can be used, and therefore, its description is omitted.

[Separator]

The separator 13 partitions the positive electrode 11 and the negative electrode 12 from each other and allows a lithium ion to pass therethrough while preventing a short circuit of the current to be caused due to the contact between the both electrodes. As this separator 13, any material is useful so far as it is electrochemically stable and chemically stable against the positive electrode active material, the negative electrode active material or the solvent and does not have electrical conductivity. Examples thereof include a nonwoven fabric of a polymer, a porous film and a material obtained by forming glass or ceramic fibers into a paper-like state, and a plurality of these materials may be laminated and used. In particular, it is preferable to use a porous polyolefin film, and this may be compounded with a heat-resistant material made of polyimide, glass or ceramic fibers and used. This separator 13 is impregnated with the foregoing electrolyte.

In this nonaqueous electrolyte battery, for example, when charged, a lithium ion is deintercalated from the positive electrode 11 and intercalated in the negative electrode 12 via the electrolytic solution impregnated in the separator 13. On the other hand, for example, when discharged, a lithium ion is deintercalated from the negative electrode 12 and intercalated in the positive electrode 11 via the electrolytic solution impregnated in the separator 13.

According to this nonaqueous electrolyte battery, in the case where a capacity of the negative electrode 12 is expressed on the basis of intercalation and deintercalation of lithium, since the nonaqueous electrolyte battery is provided with the electrolytic solution according to the foregoing first embodiment, the decomposition reaction of the electrolytic solution is suppressed at the time of charge/discharge. In consequence, in particular, the cycle characteristics and storage characteristics at the time of use at high temperatures can be enhanced.

The electrolytic solution may be impregnated in a separator in which a porous polyolefin film and a nonaqueous electrolyte in a semi-solid state are jointly used. That is, the separator 13 on the surface of which is cladded a polymer material for holding the electrolytic solution thereon can be used. By using such separator 13, on the occasion of impregnating an electrolytic solution in the separator in a battery fabrication step to be conducted later, an electrolyte layer is formed on the surface of the separator 13. At that time, a material containing the orthoester compound represented by the formula (1) and the cyclic carbonate compound represented by any of the formulae (2) to (5) is used as the electrolytic solution. Also, according to the second embodiment, a nonaqueous electrolyte layer may be used as a layer for partitioning the positive electrode 11 and the negative electrode 12 from each other.

(2-2) Manufacturing Method of Nonaqueous Electrolyte Battery

[Manufacturing Method of Positive Electrode]

A positive electrode active material, a binder and a conductive agent are mixed to prepare a positive electrode mixture, and this positive electrode mixture is dispersed in a solvent such as N-methyl-2-pyrrolidone, thereby preparing a positive electrode mixture slurry. Subsequently, this positive electrode mixture slurry is coated on the positive electrode collector 11A and dried, and the resultant is then compression molded by a roll press or the like to form the positive electrode active material layer 11B. There is thus obtained the positive electrode 11.

[Manufacturing Method of Negative Electrode]

A negative electrode active material and a binder are mixed to prepare a negative electrode mixture, and this negative electrode mixture is dispersed in a solvent such as N-methyl-2-pyrrolidone, thereby preparing a negative electrode mixture slurry. Subsequently, this negative electrode mixture slurry is coated on the negative electrode collector 12A, and after drying the solvent, the resultant is compression molded by a roll press or the like to form the negative electrode active material layer 12B. There is thus obtained the negative electrode 12.

[Assembling Method of Nonaqueous Electrolyte Battery]

An assembling method of the nonaqueous electrolyte battery provided with a nonaqueous electrolyte layer according to the second embodiment is hereunder described. The nonaqueous electrolyte battery according to the second embodiment is, for example, manufactured by the following three kinds of manufacturing methods.

(a) First Manufacturing Method

First of all, a precursor solution containing the orthoester compound represented by the formula (1), the cyclic carbonate compound represented by any of the formulae (2) to (5) and a solvent together with a nonaqueous solvent and an electrolyte salt is prepared. Thereafter, this precursor solution is coated on the surface of each of the positive electrode 11 and the negative electrode 12, and the solvent is then vaporized to form the nonaqueous electrolyte layer 14 in a gel form. Subsequently, the positive electrode lead 15 is installed in the positive electrode collector 11A, and the negative electrode lead 16 is also installed in the negative electrode collector 12A. Here, the positive electrode lead 15 and the negative electrode lead 16 may be installed in the positive electrode collector 11A and the negative electrode collector 12A, respectively before forming the nonaqueous electrolyte layer 14.

Subsequently, the positive electrode 11 and the negative electrode 12 each having the nonaqueous electrolyte layer 14 provided thereon are laminated via the separator 13, the laminate is then wound in a longitudinal direction thereof, and the protective tape 18 is allowed to adhere to an outermost peripheral part thereof, thereby forming the wound electrode body 10. Finally, for example, the wound electrode body 10 is interposed between the two package members 19 in a film form, and the outer edges of the package members 19 are allowed to adhere to each other by means of heat fusion or the like and sealed under reduced pressure, thereby enclosing the wound electrode body 10 therein. At that time, the contact film 17 is inserted between each of the positive electrode lead 15 and the negative electrode lead 16 and the package member 19. There is thus completed the nonaqueous electrolyte battery according to the second embodiment.

(b) Second Manufacturing Method

First of all, the positive electrode lead 15 is installed in the positive electrode collector 11A, and the negative electrode lead 16 is also installed in the negative electrode collector 12A. The positive electrode 11 and the negative electrode 12 are then laminated via the separator 13, the laminate is then wound in a longitudinal direction thereof, and the protective tape 18 is allowed to adhere to an outermost peripheral part thereof, thereby forming the wound electrode body 10. Subsequently, the wound electrode body 10 is interposed between the two package members 19 in a film form, and the outer edges exclusive of one side are allowed to adhere to each other by means of heat fusion or the like, thereby housing the wound electrode body 10 in the inside of the package member 19 in a bag form.

Subsequently, an electrolyte composition containing an electrolytic solution containing the orthoester compound represented by the formula (1) and the cyclic carbonate compound represented by any of the formulae (2) to (5) together with a nonaqueous solvent and an electrolyte salt, a monomer which is a raw material of a polymer compound for holding the electrolytic solution thereon, a polymerization initiator and optionally, other materials such as a polymerization inhibitor is prepared and injected into the inside of the package member 19 in a bag form. Finally, an opening of the package member 19 is sealed by means of heat fusion or the like, and the monomer is heat polymerized to form a polymer compound, thereby forming the nonaqueous electrolyte layer 14 in a gel form. There is thus completed the nonaqueous electrolyte battery according to the second embodiment.

(c) Third Manufacturing Method

First of all, a polymer compound for holding the electrolytic solution thereon is coated on the both surfaces of the separator 13. Examples of the polymer compound which is coated on this separator 13 include polymers composed of, as a component, vinylidene fluoride, namely a homopolymer, a copolymer or a multi-component copolymer, or the like. Specific examples thereof include polyvinylidene fluoride; a binary copolymer composed of, as components, vinylidene fluoride and hexafluoropropylene; and a ternary copolymer composed of, as components, vinylidene fluoride, hexafluoropropylene and chlorotrifluoroethylene. The polymer compound may contain one or two or more kinds of other polymer compounds together with the foregoing polymer composed of, as a component, vinylidene fluoride.

Next, the positive electrode lead 15 is installed in the positive electrode collector 11A, and the negative electrode lead 16 is also installed in the negative electrode collector 12A. The positive electrode 11 and the negative electrode 12 are then laminated via the separator 13, the laminate is then wound in a longitudinal direction thereof, and the protective tape 18 is allowed to adhere to an outermost peripheral part thereof, thereby forming the wound electrode body 10, followed by housing the wound electrode body 10 in the inside of the package member 19 in a bag form. Thereafter, an electrolytic solution containing the orthoester compound represented by the formula (1) and the cyclic carbonate compound represented by any of the formulae (2) to (5) together with a nonaqueous solvent and an electrolyte salt is injected into the inside of the package member 19, and an opening of the package member 19 is then sealed by means of heat fusion or the like. Finally, the separator 13 is brought into intimate contact with each of the positive electrode 11 and the negative electrode 12 via the polymer compound upon heating while adding a weight to the package member 19. According to this, the electrolytic solution is impregnated into the polymer compound to form the nonaqueous electrolyte layer 14 in a gel form. There is thus completed the nonaqueous electrolyte battery according to the second embodiment.

As compared with the first manufacturing method, according to the third manufacturing method, blister of the nonaqueous electrolyte battery is suppressed. Also, as compared with the second manufacturing method, according to the third manufacturing method, the monomer which is a raw material of the polymer compound, the solvent and the like do not substantially remain in the electrolyte, and the formation step of the polymer compound is favorably controlled, and therefore, sufficient adhesion between each of the positive electrode 11, the negative electrode 12 and the separator 13 and the electrolyte is obtainable. For that reason, it is more preferable to adopt the third manufacturing method.

According to such a nonaqueous electrolyte battery, the resistance of a coating film on the electrode surface is low, and the stability of a coating film is high. For that reason, it is possible to provide a nonaqueous electrolyte battery which is suppressed in a decomposition reaction of the electrolytic solution and which is excellent in battery characteristics such as cycle characteristics and load characteristic.

EXAMPLES

The embodiments are specifically described below with reference to the following Examples, but are limited only to these Examples.

The orthoester compounds used in Examples 1 to 3 are as follows.

Compound A: Trimethyl orthoformate
Compound B: Triethyl orthoformate
Compound C: Tri-n-propyl orthoformate
Compound D: Trimethyl orthovalerate
Compound E: Triethyl orthobenzoate Also, the cyclic ester compounds used in Examples 1 to 3 are as follows.

Compound F: 4-Fluoro-1,3-dioxolan-2-one
Compound G: 4-Chloro-1,3-dioxolan-2-one
Compound H: Vinylene carbonate
Compound I: Vinyl ethylene carbonate
Compound J: 4-Methylene-1,3-dioxolan-2-one Example 1

In Example 1, Compound A was used as the orthoester compound, and Compound F was used as the cyclic ester compound. Battery characteristics were evaluated by changing a mixing amount of each of these compounds.

Example 1-1

Fabrication of Positive Electrode 94 parts by weight of lithium cobaltate ($LiCoO_2$) as a positive electrode active material, 3 parts by weight of graphite as a conductive agent and 3 parts by weight of polyvinylidene fluoride (PVdF) as a binder were homogeneously mixed to prepare a positive electrode mixture. This positive electrode mixture was dispersed in N-methylpyrrolidone to obtain a positive electrode mixture slurry.

Next, this positive electrode mixture slurry was uniformly coated on the both surfaces of a 10 μm-thick aluminum (Al) foil serving as a positive electrode collector, and after drying, the resultant was compression molded to form a positive electrode active material layer having a thickness of 30 μm per surface. At that time, the positive electrode active material layer was prepared so as to have a volume density of 3.40 g/cc after the compression molding. A positive electrode sheet having the positive electrode active material layer formed on the positive electrode collector was cut into a shape of 50 mm in width and 300 mm in length to obtain a positive electrode.

[Fabrication of Negative Electrode]

97 parts by weight of a mixed graphite material of amorphous coated natural graphite and natural graphite (MAGX-$SO_2$, manufactured by Hitachi Chemical Co., Ltd.) as a negative electrode active material, 1 part by weight of carboxymethyl cellulose as a binder and 2 parts by weight of a styrene butadiene rubber were homogeneously mixed to prepare a negative electrode mixture. At that time, a material having a specific surface area of 3.61 $m^2/g$ was used as the negative electrode active material. Water was added to this negative electrode mixture, thereby obtaining a negative electrode mixture slurry.

Subsequently, this negative electrode mixture slurry was uniformly coated on the both surfaces of a 10 μm-thick copper (Cu) foil serving as a negative electrode collector, and after drying, the resultant was pressed at 200 MPa, thereby forming a negative electrode active material layer having a thickness of 34 μm per surface. At that time, the negative electrode active material layer was prepared so as to have a volume density of 1.60 g/cc after the compression molding. A thus fabricated negative electrode sheet was cut into a shape of 50 mm in width and 300 mm in length to obtain a negative electrode.

[Fabrication of Separator]

Polyvinylidene fluoride (PVdF) which is a polymer material for holding an electrolytic solution thereon was coated in a thickness of 2 μm on each of the surfaces of a microporous polyethylene film having a thickness of 7 μm, thereby fabricating a separator.

[Preparation of Nonaqueous Electrolytic Solution]

1.0 mole/kg of lithium hexafluorophosphate ($LiPF_6$) as an electrolyte salt was dissolved in a mixed solution of ethylene carbonate (EC) and diethyl carbonate (DEC) in a mass ratio of 4/6. Furthermore, 0.005% by weight of a material of Compound A as the orthoester compound and 1% by weight of a material of Compound F as the cyclic ester compound were dissolved to prepare an electrolytic solution.

[Assembling of Battery]

The thus fabricated positive electrode and negative electrode were laminated via the separator and wound to fabricate a wound electrode body. Thereafter, the wound electrode body was housed in a package member in a bag form made of an aluminum laminated film, and 2 g of the electrolytic solution was then injected. Finally, the wound electrode body portion was pressurized and heated to hold the electrolytic solution on polyvinylidene fluoride (PVdF) coated on the separator, thereby forming a gel electrolyte layer. Also, an opening portion of the package member was sealed upon heat fusion under reduced pressure. There was thus obtained a laminated film type battery of Example 1-1.

Example 1-2

A laminated film type battery was fabricated in the same manner as in Example 1-1, except for regulating the mixing amount of the orthoester compound to be added to the electrolytic solution to 0.01% by weight.

Example 1-3

A laminated film type battery was fabricated in the same manner as in Example 1-1, except for regulating the mixing amounts of the orthoester compound and the cyclic ester compound to be added to the electrolytic solution to 0.5% by weight and 0.5% by weight, respectively.

Example 1-4

A laminated film type battery was fabricated in the same manner as in Example 1-1, except for regulating the mixing amount of the orthoester compound to be added to the electrolytic solution to 0.5% by weight.

Example 1-5

A laminated film type battery was fabricated in the same manner as in Example 1-1, except for regulating the mixing amounts of the orthoester compound and the cyclic ester compound to be added to the electrolytic solution to 0.5% by weight and 3% by weight, respectively.

Example 1-6

A laminated film type battery was fabricated in the same manner as in Example 1-1, except for regulating the mixing amounts of the orthoester compound and the cyclic ester compound to be added to the electrolytic solution to 0.5% by weight and 5% by weight, respectively.

Example 1-7

A laminated film type battery was fabricated in the same manner as in Example 1-1, except for regulating the mixing amount of the orthoester compound to be added to the electrolytic solution to 1% by weight.

Example 1-8

A laminated film type battery was fabricated in the same manner as in Example 1-1, except for regulating the mixing amount of the orthoester compound to be added to the electrolytic solution to 2% by weight.

Comparative Example 1-1

A laminated film type battery was fabricated in the same manner as in Example 1-1, except for using an electrolytic solution in which neither the orthoester compound nor the cyclic ester compound was mixed.

Comparative Example 1-2

A laminated film type battery was fabricated in the same manner as in Example 1-1, except for regulating the mixing amount of the orthoester compound to be added to the electrolytic solution to 1% by weight and not mixing the cyclic ester compound.

Comparative Example 1-3

A laminated film type battery was fabricated in the same manner as in Example 1-1, except for not adding the orthoester compound to the electrolytic solution.

Comparative Example 1-4

A laminated film type battery was fabricated in the same manner as in Example 1-1, except for regulating the mixing amount of the orthoester compound to be added to the electrolytic solution to 5% by weight.

Comparative Example 1-5

A laminated film type battery was fabricated in the same manner as in Example 1-1, except for regulating the mixing amount of the orthoester compound to be added to the electrolytic solution to 1% by weight and using, as the separator, a microporous polyethylene film on the surface of which had not been coated polyvinylidene fluoride (PVdF). At the time of sealing the package member, heating and pressurization of the wound electrode body for holding the electrolytic solution on polyvinylidene fluoride were not conducted.

[Evaluation of Battery]

The thus fabricated laminated film type batteries were evaluated as follows.

(a) Evaluation of Presence or Absence of Gas Generation at the Time of Initial Charge:

The laminated film type battery of each of the Examples and Comparative Examples was subjected to constant-current charge in a constant current of 900 mA under an environment at 23° C. until a voltage reached 4.2 V and then subjected to constant-voltage charge until a total charge time reached 2.5 hours. Thereafter, the presence or absence of deformation of the battery cell to be caused due to the gas generation at the time of initial charge was confirmed through visual inspection. With respect to a battery cell in which the gas generation was observed, an increase rate of the thickness of the battery cell was determined.

(b) Evaluation of Discharge Capacity Retention Rate after Long-Term Cycle:

The laminated film type battery of each of the Examples and Comparative Examples was subjected to constant-current charge in a constant current of 900 mA under an environment at 23° C. until a voltage reached 4.2 V and then subjected to constant-voltage charge until a total charge time reached 2.5 hours. Thereafter, the battery was discharged at 900 mA until the voltage reached 3.0 V. At that time, a discharge capacity was determined as an initial capacity.

The charge/discharge cycle was conducted under the same charge/discharge condition, and a discharge capacity at the time of discharge at the 300th cycle was determined as a discharge capacity at the 300th cycle. A discharge capacity retention rate at the 300th cycle was calculated on the basis of the following expression.

Discharge capacity retention rate [%]={(Discharge capacity at the 300th cycle)/(Initial capacity)}×100

(c) Evaluation of Cell Thickness after Long-Term Cycle

With respect to each battery after repeating the charge/discharge of 300 cycles by the evaluation of discharge capacity retention rate as set forth above in (b), a difference between a battery thickness after 300 cycles and a battery thickness after the initial discharge was measured, thereby determining an increase amount of the cell thickness.

(d) Evaluation of Load Characteristic after Long-Term Cycle

Each battery after repeating the charge/discharge of 300 cycles by the evaluation of discharge capacity retention rate as set forth above in (b) was subjected to constant-current and constant-voltage charge to an upper limit voltage of 4.2 V in a current of 1 C and then subjected to constant-current discharge to a cut-off voltage of 3.0 V in a current of 0.2 C, thereby measuring a discharge capacity (0.2 C discharge capacity). Next, the battery was subjected to constant-current and constant-voltage charge to an upper limit voltage of 4.2 V in a current of 1 C and then subjected to constant-current discharge to a cut-off voltage of 3.0 V in a current of 3 C, thereby measuring a discharge capacity (3 C discharge capacity). The term "0.2 C" as referred to herein is a current value at which a theoretical capacity is completely discharged for 5 hours; and the term "3 C" as referred to herein is a current value at which a theoretical capacity is completely discharged for 20 minutes. Then, a load characteristic was calculated on the basis of the following expression.

Load characteristic [%]={(3 C discharge capacity)/ (0.2 C discharge capacity)}×100

(e) Evaluation of Battery Resistance after Storage at High Temperatures:

The laminated film type battery of each of the Examples and Comparative Examples was subjected to constant-current charge in a constant current of 900 mA under an environment at 23° C. until a voltage reached 4.2 V and then subjected to constant-voltage charge until a total charge time reached 2.5 hours. Thereafter, scanning was conducted at a frequency of from 1 mHz to 50 mHz using an AC impedance measurement apparatus, and a Cole-Cole plot in which the ordinate expresses an imaginary part, whereas the abscissa expresses a real part was prepared. Subsequently, an arc portion of this Cole-Cole plot was subjected to fitting with a circle, and a larger value of two points intersecting with the real part of this circle was defined as resistance of the battery.

Next, the battery in a charged state was placed as it was in a thermostat at 60° C. and stored for 15 days. Thereafter, resistance of the battery was measured in the same manner as described above. Then, a change in the resistance after the storage at 60° C. was calculated on the basis of the following expression.

Change in resistance after storage at 60° C. [mΩ]= (Resistance after storage at 60° C.)−(Resistance at the time of initial charge)

Results of each of the measurements are shown in the following Table 1.

TABLE 1

| | Orthoester compound | | Cyclic carbonate compound | | | Gas generation at the time of initial charge | Discharge capacity retention rate [%] | Increase of cell thickness [mm] | Load characteristic [%] | Change in resistance after storage at 60° C. [mΩ] |
|---|---|---|---|---|---|---|---|---|---|---|
| | Kind | Mixing amount [% by weight] | Kind | Mixing amount [% by weight] | Electrolyte | | | | | |
| Example 1-1 | Compound A | 0.005 | Compound F | 1 | Gel electrolyte | − | 74 | 0.40 | 58 | 25 |
| Example 1-2 | | 0.01 | | 1 | | − | 81 | 0.37 | 68 | 20 |
| Example 1-3 | | 0.5 | | 0.5 | | − | 90 | 0.34 | 78 | 14 |
| Example 1-4 | | | | 1 | | − | 91 | 0.33 | 80 | 15 |
| Example 1-5 | | | | 3 | | − | 92 | 0.33 | 81 | 15 |
| Example 1-6 | | | | 5 | | − | 90 | 0.35 | 77 | 18 |
| Example 1-7 | | 1 | | 1 | | − | 90 | 0.34 | 80 | 15 |
| Example 1-8 | | 2 | | 1 | | + | 88 | 0.38 | 76 | 16 |
| Comparative Example 1-1 | — | — | — | — | Gel electrolyte | + | 62 | 0.85 | 52 | 40 |
| Comparative Example 1-2 | Compound A | 1 | — | — | | ++ | 66 | 1.33 | 54 | 41 |
| Comparative Example 1-3 | — | — | Compound F | 1 | | − | 72 | 0.40 | 53 | 39 |
| Comparative Example 1-4 | Compound A | 5 | | | | ++ | 58 | 0.57 | 56 | 45 |
| Comparative Example 1-5 | Compound A | 1 | Compound F | 1 | Electrolytic solution | + | 92 | 1.23 | 75 | 40 |

In Table 1, in the evaluation of presence or absence of gas generation at the time of initial charge as set forth above in (a), the case where the gas generation was not observed is designated as "−"; the case where the increase amount of the thickness of the battery cell was less than 10% is designated as "+"; and the case where the increase amount of the thickness of the battery cell was 10% or more is designated as "++".

As is noted from Table 1, by using the gel electrolyte containing the orthoester compound and the cyclic ester compound according to the embodiments, it is possible to suppress the increase of the cell thickness after long-term cycle and to realize high battery characteristics while suppressing the gas generation at the time of initial charge. From the viewpoints of the gas generation and the change in resistance, it is preferable that the addition amount of the orthoester compound is 0.01% by weight or more and not more than 1% by weight.

In Comparative Example 1-2 in which the gel electrolyte containing only the orthoester compound according to the embodiments but not containing the cyclic ester compound is provided and Comparative Example 1-4 in which both of the orthoester compound and the cyclic ester compound are contained in the gel electrolyte, the gas generation at the time of initial charge was confirmed, and the increase amount of the thickness of the battery cell was 10% or more. With respect to Comparative Example 1-2, it may be considered that since the cyclic ester compound was not added, but the orthoester compound was added singly, the orthoester compound reacted only on the negative electrode, and the decomposition of the electrolyte on the surface of the positive electrode could not be suppressed. Also, with respect to Comparative Example 1-4, it may be considered that since the addition amount of the orthoester compound was too large, the amount of the gas generation to be caused due to the decomposition of the orthoester compound became large. Also, even in Comparative Example 1-1 in which the gel electrolyte did not contain both of the orthoester compound and the cyclic ester compound, it was noted that the gas generation was caused.

Also, as seen in Comparative Example 1-5, in the case of using an electrolytic solution which is a fluid electrolyte, blister of the battery cell is caused. It may be considered that this was caused in view of the matter that different from the battery cell using the gel electrolyte, the positive electrode or negative electrode and the separator were not bonded to each other, and therefore, the distance between the electrodes could not be kept due to the gas generation or the like during the storage.

Example 2

In Example 2, the material of each of the orthoester compound and the cyclic ester compound was changed, thereby confirming the effects of the addition thereof Example 2-1

A laminated film type battery was fabricated in the same manner as in Example 1-1, except for using Compound A as the orthoester compound to be added to the electrolytic solution and regulating its mixing amount to 0.5% by weight and also using Compound F as the cyclic ester compound to be added to the electrolytic solution and regulating its mixing amount to 1% by weight.

Example 2-2

A laminated film type battery was fabricated in the same manner as in Example 2-1, except for using Compound A as the orthoester compound to be added to the electrolytic solution and regulating its mixing amount to 0.5% by weight and also using Compound G as the cyclic ester compound to be added to the electrolytic solution and regulating its mixing amount to 1% by weight.

Example 2-3

A laminated film type battery was fabricated in the same manner as in Example 2-1, except for using Compound A as the orthoester compound to be added to the electrolytic solution and regulating its mixing amount to 0.5% by weight and also using Compound H as the cyclic ester compound to be added to the electrolytic solution and regulating its mixing amount to 1% by weight.

Example 2-4

A laminated film type battery was fabricated in the same manner as in Example 2-1, except for using Compound A as the orthoester compound to be added to the electrolytic solution and regulating its mixing amount to 0.5% by weight and also using Compound I as the cyclic ester compound to be added to the electrolytic solution and regulating its mixing amount to 1% by weight.

Example 2-5

A laminated film type battery was fabricated in the same manner as in Example 2-1, except for using Compound A as the orthoester compound to be added to the electrolytic solution and regulating its mixing amount to 0.5% by weight and also using Compound J as the cyclic ester compound to be added to the electrolytic solution and regulating its mixing amount to 1% by weight.

Examples 2-6 to 2-10

Laminated film type batteries were fabricated in the same manners as in Examples 2-1 to 2-5, respectively, except for using Compound B as the orthoester compound to be added to the electrolytic solution.

Examples 2-11 to 2-15

Laminated film type batteries were fabricated in the same manners as in Examples 2-1 to 2-5, respectively, except for using Compound C as the orthoester compound to be added to the electrolytic solution.

Examples 2-16 to 2-20

Laminated film type batteries were fabricated in the same manners as in Examples 2-1 to 2-5, respectively, except for using Compound D as the orthoester compound to be added to the electrolytic solution.

Examples 2-21 to 2-25

Laminated film type batteries were fabricated in the same manners as in Examples 2-1 to 2-5, respectively, except for using Compound E as the orthoester compound to be added to the electrolytic solution.

[Evaluation of Battery]

The thus fabricated laminated film type batteries were evaluated in the same manners as in Example 1 as follows.

(a) Evaluation of presence or absence of gas generation at the time of initial charge (b) Evaluation of discharge capacity retention rate after long-term cycle (c) Evaluation of cell thickness after long-term cycle (d) Evaluation of load characteristic after long-term cycle (e) Evaluation of battery resistance after storage at high temperatures Results of each of the measurements are shown in the following Table 2.

TABLE 2

| | Orthoester compound | | Cyclic carbonate compound | | | Gas generation at the time of initial charge | Discharge capacity retention rate [%] | Increase of cell thickness [mm] | Load characteristic [%] | Change in resistance after storage at 60° C. [mΩ] |
|---|---|---|---|---|---|---|---|---|---|---|
| | Kind | Mixing amount [% by weight] | Kind | Mixing amount [% by weight] | Electrolyte | | | | | |
| Example 2-1 | Compound A | 0.5 | Compound F | 1 | Gel electrolyte | – | 91 | 0.33 | 80 | 15 |
| Example 2-2 | | | Compound G | | | – | 82 | 0.41 | 72 | 21 |

TABLE 2-continued

| | Orthoester compound | | Cyclic carbonate compound | | | Gas generation at the time of initial charge | Discharge capacity retention rate [%] | Increase of cell thickness [mm] | Load characteristic [%] | Change in resistance after storage at 60° C. [mΩ] |
|---|---|---|---|---|---|---|---|---|---|---|
| | Kind | Mixing amount [% by weight] | Kind | Mixing amount [% by weight] | Electrolyte | | | | | |
| Example 2-3 | | | Compound H | | | – | 90 | 0.36 | 79 | 16 |
| Example 2-4 | | | Compound I | | | – | 88 | 0.36 | 78 | 17 |
| Example 2-5 | | | Compound J | | | – | 85 | 0.38 | 76 | 17 |
| Example 2-6 | Compound B | 0.5 | Compound F | 1 | Gel electrolyte | – | 92 | 0.30 | 82 | 15 |
| Example 2-7 | | | Compound G | | | – | 85 | 0.41 | 75 | 19 |
| Example 2-8 | | | Compound H | | | – | 92 | 0.35 | 80 | 16 |
| Example 2-9 | | | Compound I | | | – | 90 | 0.34 | 81 | 17 |
| Example 2-10 | | | Compound J | | | – | 87 | 0.36 | 78 | 17 |
| Example 2-11 | Compound C | 0.5 | Compound F | 1 | Gel electrolyte | – | 90 | 0.32 | 81 | 16 |
| Example 2-12 | | | Compound G | | | – | 83 | 0.42 | 73 | 20 |
| Example 2-13 | | | Compound H | | | – | 90 | 0.37 | 78 | 17 |
| Example 2-14 | | | Compound I | | | – | 89 | 0.36 | 78 | 17 |
| Example 2-15 | | | Compound J | | | – | 86 | 0.39 | 77 | 16 |
| Example 2-16 | Compound D | 0.5 | Compound F | 1 | Gel electrolyte | – | 88 | 0.37 | 79 | 19 |
| Example 2-17 | | | Compound G | | | – | 81 | 0.46 | 71 | 23 |
| Example 2-18 | | | Compound H | | | – | 88 | 0.42 | 77 | 20 |
| Example 2-19 | | | Compound I | | | – | 85 | 0.43 | 77 | 20 |
| Example 2-20 | | | Compound J | | | – | 84 | 0.45 | 76 | 22 |
| Example 2-21 | Compound E | 0.5 | Compound F | 1 | Gel electrolyte | – | 89 | 0.35 | 78 | 17 |
| Example 2-22 | | | Compound G | | | – | 81 | 0.45 | 71 | 23 |
| Example 2-23 | | | Compound H | | | – | 88 | 0.40 | 76 | 18 |
| Example 2-24 | | | Compound I | | | – | 86 | 0.41 | 77 | 18 |
| Example 2-25 | | | Compound J | | | – | 84 | 0.42 | 75 | 20 |

In Table 2, in the evaluation of presence or absence of gas generation at the time of initial charge as set forth above in (a), the case where the gas generation was not observed is designated as "–"; the case where the increase amount of the thickness of the battery cell was less than 10% is designated as "+"; and the case where the increase amount of the thickness of the battery cell was 10% or more is designated as "++".

It was noted from Table 2 that as to the kind of the orthoester compound, the orthoformates of Compounds A to C were especially preferable because the increase of the resistance was low. Also, it was noted that though even by using the cyclic carbonate compound having chlorine or the cyclic carbonate compound having an unsaturated body in place of the cyclic carbonate compound having fluorine as a halogen, the same effects are obtainable, from the viewpoints of the capacity retention rate and the load characteristic, the cyclic carbonate compound having fluorine or the unsaturated cyclic carbonate compound is especially preferable.

Example 3

In Example 3, the configuration of the negative electrode was changed, thereby confirming the effects of the addition of the orthoester compound and the cyclic ester compound.

Example 3-1

Fabrication of Negative Electrode

A material which was obtained by mixing MCMB (mesocarbon microbead) based graphite and a graphite material composed of a mixture of block artificial graphite and natural graphite (MAGX-SO1, manufactured by Hitachi Chemical Co., Ltd.) in a weight ratio of 20/80 was used as a negative electrode active material. At that time, the negative electrode active material had a specific surface area of 3.80 $m^2/g$. Also, the negative electrode active material layer was prepared so as to have a volume density of 1.60 g/cc after the compression molding.

[Preparation of Nonaqueous Electrolytic Solution]

Compound A was used as the orthoester compound to be added to the electrolytic solution, and its mixing amount was regulated to 0.5% by weight; and Compound F was used as the cyclic ester compound to be added to the electrolytic solution, and its mixing amount was regulated to 1% by weight. A laminated film type battery was fabricated in the same manner as in Example 1-1, except for this.

Example 3-2

A battery was fabricated in the same manner as in Example 3-1, except for using, as the negative electrode active material, the same mixed material of amorphous coated natural graphite and natural graphite (MAGX-SO2, specific surface area: 3.61 $m^2/g$) as in Example 1-1 and conducting pressing after drying such that the density of the negative electrode active material layer was 1.65 g/cc.

Example 3-3

A battery was fabricated in the same manner as in Example 3-1, except for using, as the negative electrode active material, the same mixed material of amorphous coated natural graphite and natural graphite (MAGX-SO2, specific surface area: 3.61 $m^2/g$) as in Example 1-1 and conducting pressing after drying such that the density of the negative electrode active material layer was 1.60 g/cc.

Example 3-4

A battery was fabricated in the same manner as in Example 3-1, except for using, as the negative electrode active material, the same mixed material of amorphous coated natural graphite and natural graphite (MAGX-SO2, specific surface area: 3.61 m²/g) as in Example 1-1 and conducting pressing after drying such that the density of the negative electrode active material layer was 1.50 g/cc.

Example 3-5

A material which was obtained by mixing MCMB (mesocarbon microbead) based graphite and the same mixed material of amorphous coated natural graphite and natural graphite (MAGX-SO2) as in Example 1-1 in a weight ratio of 20/80 was used as a negative electrode active material. A battery was fabricated in the same manner as in Example 3-1, except that at that time, the negative electrode active material had a specific surface area of 3.05 m²/g; and that the negative electrode active material layer was prepared so as to have a volume density of 1.60 g/cc after the compression molding.

Example 3-6

A material which was obtained by mixing MCMB (mesocarbon microbead) based graphite and the same mixed material of amorphous coated natural graphite and natural graphite (MAGX-SO2) as in Example 1-1 in a weight ratio of 50/50 was used as a negative electrode active material. A battery was fabricated in the same manner as in Example 3-1, except that at that time, the negative electrode active material had a specific surface area of 2.08 m²/g; and that the negative electrode active material layer was prepared so as to have a volume density of 1.60 g/cc after the compression molding.

Example 3-7

A material which was obtained by mixing MCMB (mesocarbon microbead) based graphite and the same mixed graphite material of amorphous coated natural graphite and natural graphite (MAGX-SO2) as in Example 1-1 in a weight ratio of 80/20 was used as a negative electrode active material. A battery was fabricated in the same manner as in Example 3-1, except that at that time, the negative electrode active material had a specific surface area of 1.10 m²/g; and that the negative electrode active material layer was prepared so as to have a volume density of 1.60 g/cc after the compression molding.

Comparative Example 3-1

A battery was fabricated in the same manner as in Example 3-1, except for using, as the negative electrode active material, the same graphite material composed of a mixture of block artificial graphite and natural graphite (MAGX-SO1) as in Example 3-1. At that time, the negative electrode active material had a specific surface area of 4.50 m²/g, and pressing after drying was conducted such that the negative electrode active material layer had a density of 1.60 g/cc.

Comparative Example 3-2

A battery was fabricated in the same manner as in Example 3-1, except for using, as the negative electrode active material, a material which was obtained by mixing MCMB (mesocarbon microbead) based graphite and a graphite material composed of a mixture of block artificial graphite and natural graphite (MAGX-SO1) in a weight ratio of 10/90. At that time, the negative electrode active material had a specific surface area of 4.12 m²/g. Also, the negative electrode active material layer was prepared so as to have a volume density of 1.60 g/cc after the compression molding.

Comparative Example 3-3

A material which was obtained by mixing MCMB (mesocarbon microbead) based graphite and the same mixed material of amorphous coated natural graphite and natural graphite (MAGX-SO2) as in Example 1-1 in a weight ratio of 90/10 was used as a negative electrode active material. A battery was fabricated in the same manner as in Example 3-1, except that at that time, the negative electrode active material had a specific surface area of 0.76 m²/g; and that the negative electrode active material layer was prepared so as to have a volume density of 1.60 g/cc after the compression molding.

Comparative Example 3-4

A negative electrode mixture slurry obtained by using only MCMB (mesocarbon microbead) based graphite as a negative electrode active material, homogeneously mixing 97 parts by weight of this MCMB based graphite and 3 parts by weight of PVdF and adding N-methylpyrrolidone thereto was used. A battery was fabricated in the same manner as in Example 3-1, except that at that time, the negative electrode active material had a specific surface area of 0.45 m²/g; and that the negative electrode active material layer was prepared so as to have a volume density of 1.60 g/cc after the compression molding.

[Evaluation of Battery]

The thus fabricated laminated film type batteries were evaluated in the same manners as in Example 1 as follows.

(a) Evaluation of presence or absence of gas generation at the time of initial charge
(b) Evaluation of discharge capacity retention rate after long-term cycle
(c) Evaluation of cell thickness after long-term cycle
(d) Evaluation of load characteristic after long-term cycle
(e) Evaluation of battery resistance after storage at high temperatures Results of each of the measurements are shown in the following Table 3.

TABLE 3

| | Orthoester compound Cyclic carbonate compound | Mixing amount [% by weight] | Negative electrode Specific surface area of active material [m2/g] | Density of active material layer [g/cc] | Gas generation at the time of initial charge | Discharge capacity retention rate [%] | Increase of cell thickness [mm] | Load characteristic [%] | Change in resistance after storage at 60° C. [mΩ] |
|---|---|---|---|---|---|---|---|---|---|
| Example 3-1 | Compound A | 0.5 | 3.80 | 1.60 | – | 90 | 0.35 | 82 | 17 |
| Example 3-2 | Compound F | 1 | 3.61 | 1.65 | – | 92 | 0.34 | 79 | 14 |
| Example 3-3 | | | | 1.60 | – | 91 | 0.33 | 80 | 15 |
| Example 3-4 | | | | 1.50 | – | 89 | 0.30 | 83 | 17 |

TABLE 3-continued

|  | Orthoester compound Cyclic carbonate compound | Mixing amount [% by weight] | Negative electrode | | Gas generation at the time of initial charge | Discharge capacity retention rate [%] | Increase of cell thickness [mm] | Load characteristic [%] | Change in resistance after storage at 60° C. [mΩ] |
|---|---|---|---|---|---|---|---|---|---|
|  |  |  | Specific surface area of active material [m2/g] | Density of active material layer [g/cc] |  |  |  |  |  |
| Example 3-5 |  |  | 3.05 | 1.60 | − | 90 | 0.34 | 80 | 17 |
| Example 3-6 |  |  | 2.08 |  | − | 89 | 0.35 | 80 | 16 |
| Example 3-7 |  |  | 1.10 |  | − | 86 | 0.38 | 78 | 15 |
| Comparative Example 3-1 | Compound A Compound F | 0.5 1 | 4.50 | 1.60 | + | 84 | 0.41 | 81 | 21 |
| Comparative Example 3-2 |  |  | 4.12 |  | − | 87 | 0.39 | 80 | 19 |
| Comparative Example 3-3 |  |  | 0.76 |  | − | 80 | 0.42 | 76 | 15 |
| Comparative Example 3-4 |  |  | 0.45 |  | − | 78 | 0.44 | 75 | 15 |

In Table 3, in the evaluation of presence or absence of gas generation at the time of initial charge as set forth above in (a), the case where the gas generation was not observed is designated as "−"; the case where the increase amount of the thickness of the battery cell was less than 10% is designated as "+"; and the case where the increase amount of the thickness of the battery cell was 10% or more is designated as "++".

It was noted from Table 3 that in Examples 3-1 to 3-7 using, as the negative electrode active material, a carbon material whose specific surface area is controlled within the scope of the present application, the effects of the orthoester compound and the cyclic carbonate compound according to the embodiments are more effectively obtainable.

On the other hand, in the case where the specific surface area of the carbon material is smaller than the scope of the present application, the reaction area of the electrode was lowered, so that the sufficient load characteristic was not obtained. Also, in the case where the specific surface area of the carbon material is larger than the scope of the present application, the discharge capacity retention rate is lowered, a degree of which is, however, not equal to that in the case where the specific surface area is too small. Also, the gas generation at the time of initial charge is easy to occur, and an increase of the thickness of the battery cell to be caused due to the gas generation, a lowering of the cycle characteristics, an increase of the resistance after the storage at high temperatures and so on are generated. Therefore, such is not preferable.

Besides the use of a carbon material whose specific surface area is controlled by the treatment of the carbon material surface, it was noted from the foregoing results that the same effects are also obtainable by controlling the specific surface area on the whole of the negative electrode active material by mixing carbon materials.

In the foregoing embodiments, while the case where a battery device prepared by laminating a positive electrode and a negative electrode and winding the laminate is provided has been described, the present embodiments can also be applied to the case where a flat plate type battery device having a pair of a positive electrode and a negative electrode laminated therein, or a laminate type battery device having plural positive electrodes and negative electrodes laminated therein is provided.

Also, though the present application is concerned with a battery using lithium as an electrode reactant, it is possible to apply a technical thought of the present application to the case of using other alkali metal such as sodium (Na) and potassium (K), an alkaline earth metal such as magnesium (Mg) and calcium (Ca), or other light metal such as aluminum.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A nonaqueous electrolyte battery comprising:
a positive electrode;
a negative electrode having a negative electrode active material layer containing a negative electrode active material, wherein the negative electrode active material comprises a carbon material;
a separator disposed between the positive electrode and the negative electrode; and
a non-fluid electrolyte, wherein
the non-fluid electrolyte contains
an electrolyte salt,
a nonaqueous solvent,
an orthoester compound represented by the following formula (1), and
at least one member selected from the group consisting of cyclic carbonate compounds represented by the following formula (2) to (5),
a volume density of the negative electrode active material layer is 1.50 g/cc or more and not more than 1.75 g/cc, and
a BET specific surface area of the carbon material is 0.8 $m^2/g$ or more and not more than 4.0 $m^2/g$

(1)

wherein
R1 represents a hydrogen atom, an alkyl group or an aryl group, and preferably a hydrogen atom or an aryl group; and each of R2 to R4 independently represents an alkyl group, a halogenated alkyl group or an aryl group, and preferably an alkyl group having from 1 to 10 carbon atoms or an aryl group, and especially preferably a methyl group, an ethyl group or a propyl group, (2)

wherein
each of R5 to R8 represents a hydrogen atom, a halogen group, an alkyl group or a halogenated alkyl group, provided that at least one of R5 to R8 represents a halogen group or a halogenated alkyl group, and R5 to R8 may be the same as or different from each other; though the kind of the halogen is not particularly limited, for example, at least one member selected from the group consisting of fluorine, chlorine and bromine is exemplified, and above all, fluorine is preferable; this is because high effects are obtainable; and as a matter of course, the halogen may be other halogen, (3)

wherein
each of R9 and R10 represents a hydrogen atom or an alkyl group, (4)

wherein
each of R11 to R14 represents a hydrogen atom, an alkyl group, a vinyl group or an allyl group, provided that at least one of R11 to R14 represents a vinyl group or an allyl group, and (5)

wherein
R15 represents an alkylene group.

2. The nonaqueous electrolyte battery according to claim 1, wherein
the orthoester compound is an orthoformate;
the cyclic carbonate compound represented by the formula (2) is 4-fluoro-1,3-dioxolan-2-one or 4,5-difluoro-1,3-dioxolan-2-one;
the cyclic carbonate compound represented by the formula (3) is vinylene carbonate;
the cyclic carbonate compound represented by the formula (4) is vinyl ethylene carbonate; and
the cyclic carbonate compound represented by the formula (5) is methylene ethylene carbonate.

3. The nonaqueous electrolyte battery according to claim 2, wherein
a content of the orthoester compound in the non-fluid electrolyte is 0.01% by weight or more and not more than 1% by weight.

4. The nonaqueous electrolyte battery according to claim 2, wherein
a content of the cyclic carbonate compound in the non-fluid electrolyte is 0.5% by weight or more and not more than 40% by weight.

5. The nonaqueous electrolyte battery according to claim 1, wherein
the electrolyte salt is at least one member selected from the group consisting of lithium hexafluorophosphate (LiPF$_6$), lithium tetrafluoroborate (LiBF$_4$), lithium perchlorate (LiClO$_4$) and lithium hexafluoroarsenate (LiAsF$_6$).

6. The nonaqueous electrolyte battery according to claim 5, wherein
the non-fluid electrolyte is an electrolyte in a semi-solid state, in which an electrolytic solution containing the electrolyte salt, the nonaqueous solvent, the orthoester compound represented by the formula (1) and at least one member selected from the group consisting of the cyclic carbonate compounds represented by the formula (2) to (5) is held on a polymer.

* * * * *